US011872811B2

(12) United States Patent
Gracia Verdugo et al.

(10) Patent No.: US 11,872,811 B2
(45) Date of Patent: Jan. 16, 2024

(54) PRINTERS AND CONTROLLERS

(71) Applicant: Hewlett-Packard Development Company, L.P., Spring, TX (US)

(72) Inventors: Antonio Gracia Verdugo, Sant Cugat del Valles (ES); Andreu Vinets Alonso, Sant Cugat del Valles (ES); Andrei Alexandru Dafinoiu, Sant Cugat del Valles (ES)

(73) Assignee: Hewlett-Packard Developmen Company, L.P., Spring, TX (US)

( * ) Notice: Subject to any disclaimer, the term of this patent is extended or adjusted under 35 U.S.C. 154(b) by 0 days.

(21) Appl. No.: 17/419,408

(22) PCT Filed: Jun. 7, 2019

(86) PCT No.: PCT/US2019/035960
§ 371 (c)(1),
(2) Date: Jun. 29, 2021

(87) PCT Pub. No.: WO2020/246984
PCT Pub. Date: Dec. 10, 2020

(65) Prior Publication Data

US 2022/0088922 A1 Mar. 24, 2022

(51) Int. Cl.
*B41J 2/045* (2006.01)

(52) U.S. Cl.
CPC ......... *B41J 2/04513* (2013.01); *B41J 2/0456* (2013.01); *B41J 2/0458* (2013.01); *B41J 2/04561* (2013.01); *B41J 2/04563* (2013.01); *B41J 2/04581* (2013.01)

(58) Field of Classification Search
CPC ............................ B41J 2/0459; B41J 2/04591
See application file for complete search history.

(56) References Cited

U.S. PATENT DOCUMENTS 5,483,265 A * 1/1996 Kneezel ............... B41J 2/04593 347/14
5,644,343 A 7/1997 Allen
6,050,665 A * 4/2000 Kishi ....................... B41J 2/355 347/14
6,334,660 B1 1/2002 Holstun et al.
6,533,398 B2 3/2003 Katsuragi et al.
6,582,044 B2 6/2003 Su et al.
6,783,210 B2 8/2004 Takahashi et al.
6,866,359 B2 3/2005 Pan et al.
6,883,904 B2 4/2005 Jeanmaire et al.
7,413,279 B2 8/2008 Arakawa et al.
9,004,639 B2 4/2015 Kelly et al.
(Continued)

FOREIGN PATENT DOCUMENTS

WO WO-2017094515 A1 * 6/2017

*Primary Examiner* — Shelby L Fidler

(57) ABSTRACT

Example implementations relate to a method to manage printhead operational life; the method comprising firing at least one nozzle of a printhead according to an associated firing parameter to produce a respective drop of print liquid, measuring a parameter associated with the drop of print liquid, and adjusting the firing parameter in response to the measuring to reduce the measured parameter associated with the drop of print liquid on a subsequent firing while maintaining the firing parameter at or above a predetermined parameter limit to maintain print image quality.

18 Claims, 4 Drawing Sheets

300

(56) References Cited

U.S. PATENT DOCUMENTS

| | | | |
|---|---|---|---|
| 9,010,893 | B1 * | 4/2015 | Mizes .................. B41J 2/04588 347/19 |
| 2004/0212650 | A1 | 10/2004 | King et al. |
| 2013/0016147 | A1 | 1/2013 | Cardells Tormo et al. |
| 2019/0126616 | A1 * | 5/2019 | Canto Estany ........ B41J 2/0458 |

* cited by examiner

400

500

600

PRINTERS AND CONTROLLERS

BACKGROUND

Inkjet printing mechanisms fire drops of ink onto a print medium to generate an image. Such mechanisms may be used in a wide variety of applications, including computer printers, plotters, copiers, and facsimile machines. An inkjet printing apparatus may include a printhead having a plurality of independently addressable firing units. Each firing unit may include a liquid chamber connected to a liquid source and to a liquid outlet nozzle. A transducer within the liquid chamber provides the energy for firing drops of print liquid from the nozzles. In thermal inkjet printers, the transducers are thin-film resistors that generate sufficient heat during application of a voltage pulse to vaporize a quantity of liquid. This vaporization is sufficient to fire a drop of print liquid. However, repeated operation of the resistor can degrade performance of the printhead.

BRIEF INTRODUCTION OF THE DRAWINGS

Examples implementations are described below with reference to the accompanying drawings, in which.

DETAILED DESCRIPTION

Figure 1:
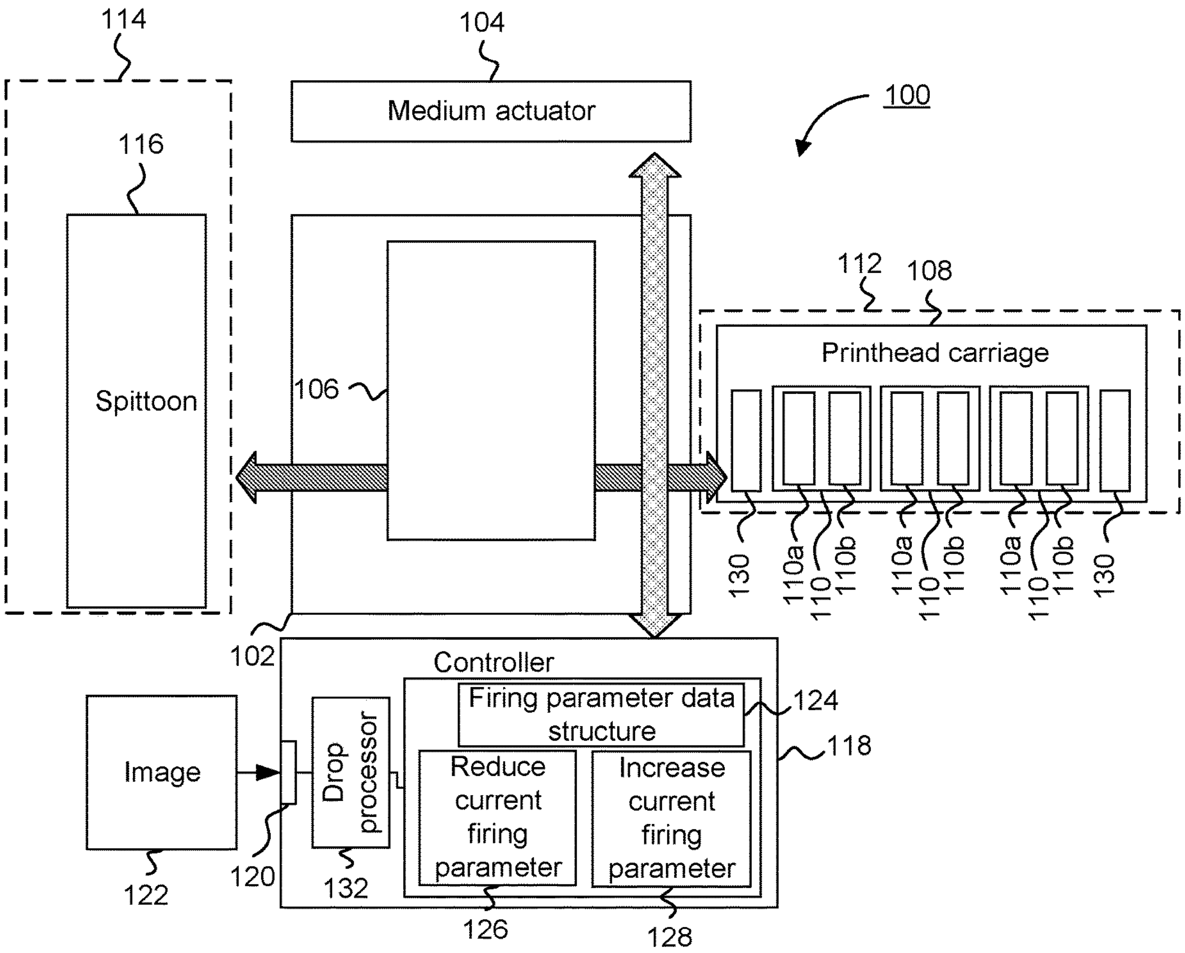
FIG. 1 shows a schematic diagram of a printer according to some examples.

FIG. 1 illustrates a schematic plan view of a printer 100. The printer 100 comprises: a working area 102 in which a printed plot or drawing can be produced. The working area is an example of a printing region. The printer 100 further comprises a medium actuator 104. The medium actuator 104 moves a medium 106 on which a printing liquid is to be deposited in between print traversals of a printhead carriage 108. A print traversal is a movement of the printhead carriage 108 from one side of the working area 102 to the other side of the working area. The printhead carriage 108 comprises one or more than one printhead 110 for printing one or more than one drop of printing liquid. A printhead 110 can comprise one or more than one channel 110*a*, 110*b* for receiving and expelling printing liquid. One or more than one printhead 110 can optionally fire, that is, expel or eject, one or more than one printing liquid during a print traversal. Examples can be realised in which the printhead carriage 108 comprises a number of printheads 110. The printheads 110 are arranged to deposit respective drops of printing liquids onto the medium 106. The one or more than one printing liquids can comprise one or more printing liquids associated with a respective colour process. Such a colour process can comprise a single tone or multiple tones. For example, a six-colour process, involving magenta, yellow, cyan, red and two blacks, can be used. Similarly, a nine-colour process could be used. In the example shown, each printhead 110 contains two channels 110*a*, 110*b* for printing liquid. The example implementation shown uses a six-colour process with the colours being ejected from respective channels 110*a*, 110*b* of the three printheads 110. Examples can be realised in which a nine-colour process can be accommodated via five printheads. Each channel comprises a number of nozzles for ejecting drops of print liquid such as the above described inks or printing liquids.

The printhead carriage 108, in this example, is arranged to traverse the working area 102 in a reciprocating manner. While traversing the working area 102, the printheads 108 can print printing liquids onto the medium 106. The printheads can deposit printing liquid onto the medium 106 in either one direction or both directions of traversal. The printheads 110 can use an array of nozzles, described with reference to FIG. 2, to deposit the printing liquids. Depositing the printing liquids can use a thermal technique in which a heating element is arranged to heat the printing liquid rapidly so that printing liquid is ejected from a nozzle associated with the heating element.

A stowage area 112 can be provided to one side of the working area 102. The printhead carriage 108 can be stowed in the stowage area 112 between printing traversals.

A maintenance area 114 can be provided to the side of the working area 102. The maintenance area 114 is an example of a maintenance region. The maintenance area 114 can comprise a spittoon 116 for receiving one or more than one printing liquid during one or a number of maintenance operations.

A controller 118 is provided for controlling one or more aspects of the printer and/or printer operations such as, for example, at least one, or both of, printing operations or maintenance operations. The controller 118 can comprise an input interface 120 for receiving an image 122 to be printed. The controller 118 is operable to print an image by firing appropriate nozzles of the channels 110*a*, 110*b* of the printheads 110. The nozzles are fired in response to respective firing parameter data stored within a data structure 124 of, or accessible by, the controller 118.

The controller 118 is also operable to change or otherwise modify the energy applied to the heaters or transducers to produce drops of print liquid. For example, the controller 118 comprises software 126 to vary, such as, for example, reduce or increase, the at least one firing parameter of each of the nozzles to prolong the life of the print head as described herein. Example implementations can be realised in which of the energy applied to the transducer to eject a drop of print liquid is an OverEnergy operational parameter, which is described below.

Furthermore, example implementations can additionally comprise further software 128 that can increase at least one parameter associated with, or that influences, a characteristic of the drop of print liquid. Example implementations of the software 126, 128 can modify the parameters stored within the data structure 124.

The printheads have an associated drop detector 130 that is arranged to determine at least one characteristic of a drop of printing liquid ejected from a nozzle. The drop detector can determine at least one of drop velocity, drop mass or any other drop feature of drops ejected from a nozzle. The data generated by the drop detector 130 is processed by a drop data processor 132 to determine the at least one characteristic of, or associated with, a drop ejected from a nozzle.

Figure 2:
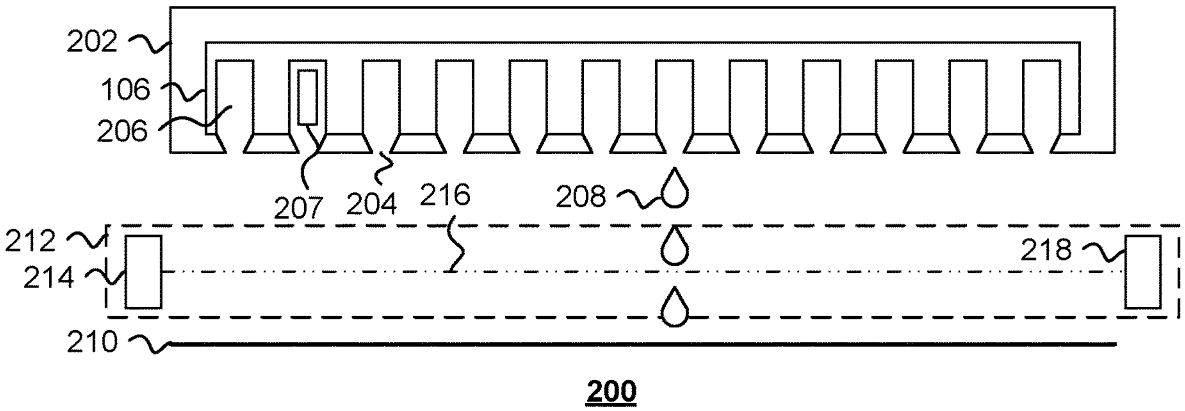
FIG. 2 illustrates schematically an apparatus of part of the printer of FIG. 1 according to some examples.

FIG. 2 shows schematically example of parts of an apparatus 200 of the printer 100 of FIG. 1. In this example, the apparatus 200 comprises a plurality of inkjet print heads 202. In other examples, the apparatus 200 may comprise one printhead.

The inkjet printhead 202 comprises a plurality of nozzles 204 in this example. A printhead may comprise, for example, over a thousand nozzles per printhead. Each nozzle can be arranged to fire at least one drop of a print liquid. Examples of a print liquid comprise, for example, an ink or a pre-treatment liquid. Each nozzle is 204 is connected to a respective liquid chamber 206. A liquid chamber 206 receives liquid from a liquid source (not shown). Each liquid chamber 206 can be connected to a separate liquid source or can be connected to a common liquid source. Such a liquid source can comprise, for example, a reservoir storing an ink or a pre-treatment liquid as indicated above.

Each liquid chamber 206 can comprise a transducer 207. Only a single transducer 207 is shown for clarity purposes even though all chambers comprises a respective transducer. Example implementations of a transducer comprise a thin film heater such as, for example, a thin film resistor, for heating the liquid in the liquid chamber 206. Alternatively, a transducer can comprise a Piezo electric transducer. To print liquid, liquid is transferred from the liquid source or liquid reservoir into the liquid chamber 206 and an actuation signal is applied to the transducer, which creates a pressure pulse in the liquid in the chamber 206 that, in turn, causes a drop 208 of print liquid to be fired from a respective nozzle 204 coupled to the chamber. The drop 208 of print liquid is directed to a print medium 210. The print medium can comprise, for example, paper or some other substrate. The print medium 210 is an example of the above described print medium 106.

The signal can take the form of, for example, a voltage pulse having a predetermined magnitude and duration.

Alternatively, or additionally, a series of voltage pulses can be applied to a transducer at a certain frequency. Such a frequency is known as the firing frequency. The series of voltage pulses can be arranged to fire at least one drop 208 of print liquid from the printhead at the firing frequency. By controlling the width and amplitude of each voltage pulse, the quantity of liquid in each fired drop of print liquid can be controlled. For example, increasing the amplitude or width of an applied voltage pulse can influence at least one, or both, of drop mass or drop velocity of a drop 208 of print liquid.

The printing apparatus shown in FIG. 2 also comprises a drop detector 212. The drop detector 212 is an example of the above-described drop detector 130. The drop detector 212 is arranged to measure a characteristic of, or associated with, at least one drop 208 of print liquid fired by the printhead 202. The drop detector may, for example, comprise a light source 214 for producing, for example, a collimated beam of light 216. The beam of light 216 can be detected by a detector 218. Example implementations can be realised in which the detector 218 is a photodetector. The light source 214 and the detector 218 are separated to allow drops of print liquid fired from the nozzles to cross the light beam 216. Drops of print liquid crossing the light beam 216 will influence the light incident upon the detector 218. The difference between an uninterrupted beam of light 216 and an interrupted beam of light is associated with one or more than one parameter or characteristic of, or associated with, the drops 208 of print liquid. One or more than one drop of print liquid can, for example, absorb and/or scatter light thereby influencing the amount of light incident upon the photodetector 218. The one or more than one parameter of the drop of print liquid can comprise at least one or more than one of drop velocity, drop mass, or drop position taken jointly and severally in any and all permutations.

Over the lifetime of the printhead, at least one, or both, of the drop velocity or the quantity/volume of print liquid ejected from the printhead for a given voltage pulse at a certain firing frequency may change. This follows as a consequence of, for example, liquid residues accumulating in the liquid chamber 206 of the printhead, which thereby reduces the quantity of print liquid ejected from the printhead by obstructing the path of the print liquid from the liquid chamber 206 through the nozzle 204. Furthermore, for example, thin-film heaters, such as thin film resistors controlling drop production within the printhead, may wear out thereby affecting the quantity of print liquid ejected additionally, or alternatively, due to a process called kogation, a scale may form on the resistor that separates the liquid from the resistor such that irregular print liquid ejection occurs.

Therefore, example implementations can be realised in which the following parameters associated with printing or firing a drop of print liquid are adapted to extend the operational life of the printhead. One such parameter is the Turn-On-Energy (TOE), which is an indication of the amount of energy delivered to a transducer, such as, for example, the above described heater 206, to eject a drop of print liquid. Another such parameter is the OverEnergy (OE) factor, which, in conjunction with the TOE, is an indicator of the energy delivered to such a transducer to eject, or otherwise fire, a drop of print liquid. The OverEnergy factor is a multiplier that is applied to the Turn-On-Energy.

Figure 3:
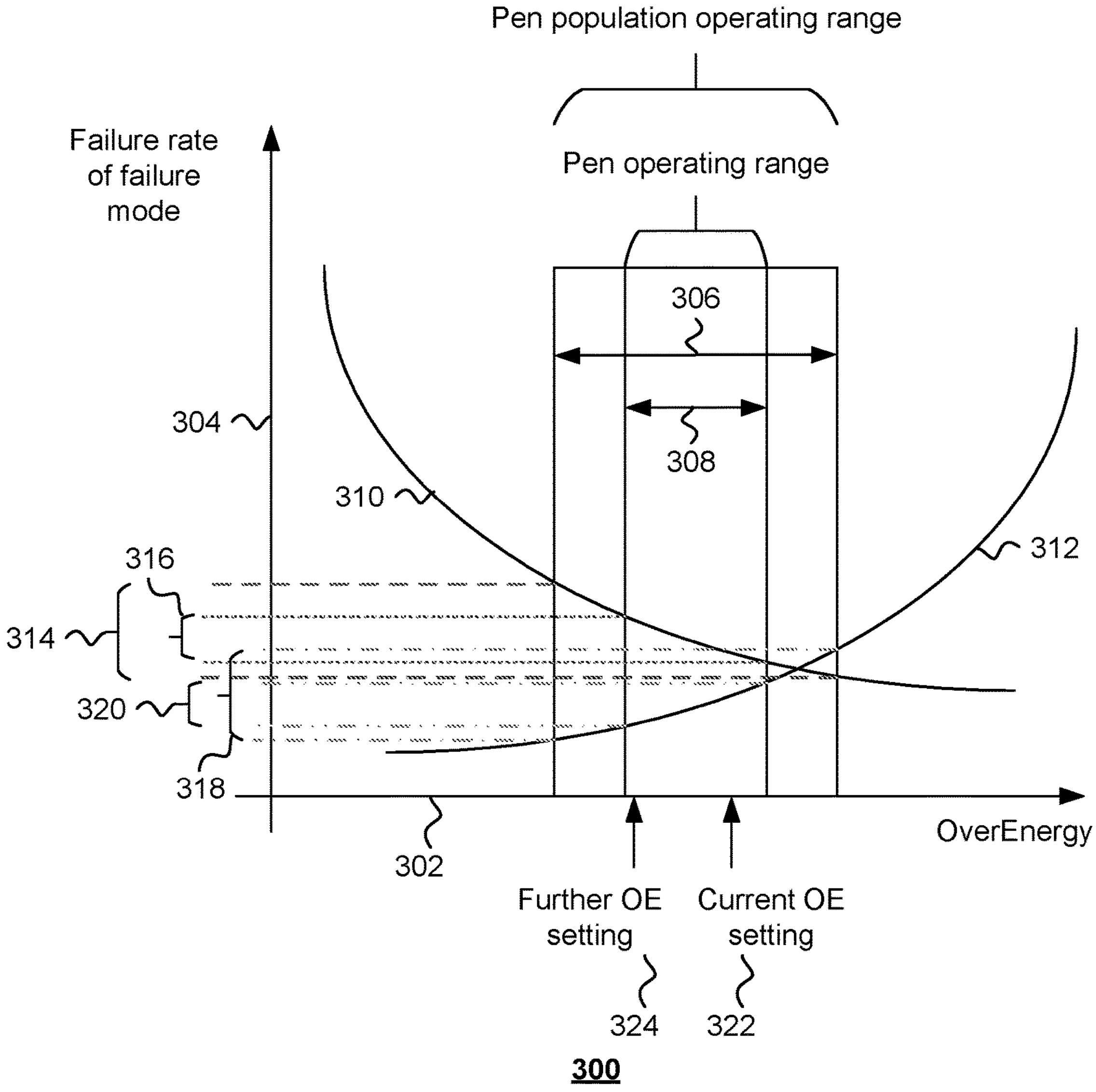
FIG. 3 depicts graphs of failure modes and operating ranges according to example implementations.

FIG. 3 shows a schematic graph 300 of the variation of failures modes and rates with OverEnergy. The graph 300 comprises an ordinate axis 302 of OverEnergy and an abscissa axis 304 of failure rate of one or more than one failure mode. The graph 300 also depicts an operational range 306 of a population or class of pens. The operational range 306 of a population or class of pens is a range of OverEnergies over which that population or class of pens can operate with at least one, or both, of a predetermined level failure rate of a respective failure mode or predetermined range of failures rates of a respective failure mode. Also illustrated is an operational range 308 of the specific or known pen of the population or class of pens. The operational range 308 of the specific pen is a range of OverEngeries over which that known pen can operate with at least one, or both, of a predetermined level of failure rate of a respective failure mode or a predetermined range of failure rates of a respective failure mode.

In the example depicted, two failure modes are illustrated by respective curves 310 and 312. One curve 310 represents a failure mode associated with drop trajectory error of a drop of print liquid. The drop trajectory error is an error associated with deviation of a drop of print liquid from an intended or ideal drop trajectory. The other curve 312 represents a failure mode associated with kogation.

Referring to the drop trajectory error curve 310, it can be appreciated that the population or class of pens comprises a range of drop trajectory errors 314 over which the drop trajectory is acceptable, that is, within upper and lower limits of performance or acceptability. Similarly, the specific or known pen comprises a range of drop trajectory errors 316 over which the drop trajectory of the specific pen is acceptable, that is, within upper and lower limits of performance or acceptability.

Referring to the kogation curve 312, it can be appreciated that the population or class of pens comprises a range of kogation errors 318 over which the kogation is acceptable, that is, within upper and lower limits of performance or acceptability. Similarly, the specific or known pen comprises a range of kogation errors 320 over which the kogation of the specific pen is acceptable, that is, within upper and lower limits of performance or acceptability.

It can be appreciated that the graph also shows a notional, current, or initial OverEnergy factor setting 322. The OverEnergy factor setting 322 can be a factory installed setting or some other setting such as, for example, a current OverEnergy factor setting. Also depicted in FIG. 3 is a further OverEnergy factor setting 324 to be associated with the specific known pen. The further OverEnergy factor setting 324 is less that the OverEnergy factor setting 322. The further OverEnergy factor setting 324 is selected such that the energy to fire a drop of print liquid within predetermined performance tolerances is reduced compared to the energy required to fire a drop of print liquid at the current OverEnergy factor setting. Example implementations can be realised in which the further OverEnergy factor setting 324 is selected such that the energy to fire a drop of print liquid within predetermined performance tolerances is reduced to a minimum compared to the energy required to fire a drop of print liquid at the current OverEnergy factor setting. Example implementations can be realised in which the energy to produce a drop of printing liquid is reduced while maintaining that energy above a predetermined threshold to maintain image quality. Accordingly, implementations can be realised in which the specific or known pen, or population or class of pens, has an acceptable operational range of firing energies for which image quality is maintained or acceptable. Example implementations can be realised in which the energies used to fire a drop of print liquid are maintained at, or above, the minimum of that operational range.

The firing performance of a given nozzle can be determined or tested by progressively varying, such as, for example, reducing, the current OverEnergy factor setting of that nozzle, firing it, and using the drop detector to assess the impact of the reduced OverEnergy factor setting. By repeatedly reducing the OverEnergy factor setting of a nozzle, firing the nozzle and assessing a characteristic of, or associated with, a drop 208 of print liquid resulting from the firing, an OverEnergy factor setting can be determined that is less that a current OverEnergy factor setting. Such a determined OverEnergy factor setting can be stored for future use.

Reducing the OverEnergy factor setting has the effect of prolonging the operational life of the nozzle, in particular, the operational life of at least one, or both, of an actuator associated with a nozzle or a printhead. The above described heater or piezoelectric actuator are examples of actuators associated with a nozzle.

Example implementations can be realised in which the firing performance is assessed based on at least one characteristic of the drop of print liquid. For example, the firing performance can be assessed based on the drop velocity of the drop of printing liquid. The quality of printing can be influenced by the characteristics of the drop of print liquid such as, for example, the drop velocity. A drop velocity below a predetermined threshold may adversely affect the print quality. Such a drop velocity below such a predetermined threshold that adversely affects the print quality sets a minimum acceptable drop velocity at which print quality is maintained. If the velocity of the drop of print liquid normal to the print medium 210 is too slow, the shape produced by the print liquid on impact with the print medium will deviate from being circular. Conversely, if the velocity of the drop of print liquid is too high, there is a risk that the drop of print liquid on impact with the print medium 210 will spread beyond an intended area or shape as a consequence of, for example, splashing. It can, therefore, be appreciated that a drop velocity that is too high or too low can result in image quality defects. Suitably, example implementations provide for adjusting the firing parameter in response to vary the measured characteristic associated with the drop of print liquid on a subsequent firing while maintaining the firing parameter at or above a predetermined parameter limit to maintain print image quality.

Example implementations can be realised in which the drop velocity of the print liquid is a function of the print liquid per se. Therefore, different print liquids can have different respective firing performances and consequently have different characteristics of, or associated with, a drop of those print liquids such as, for example, different drop velocities.

Figure 4:
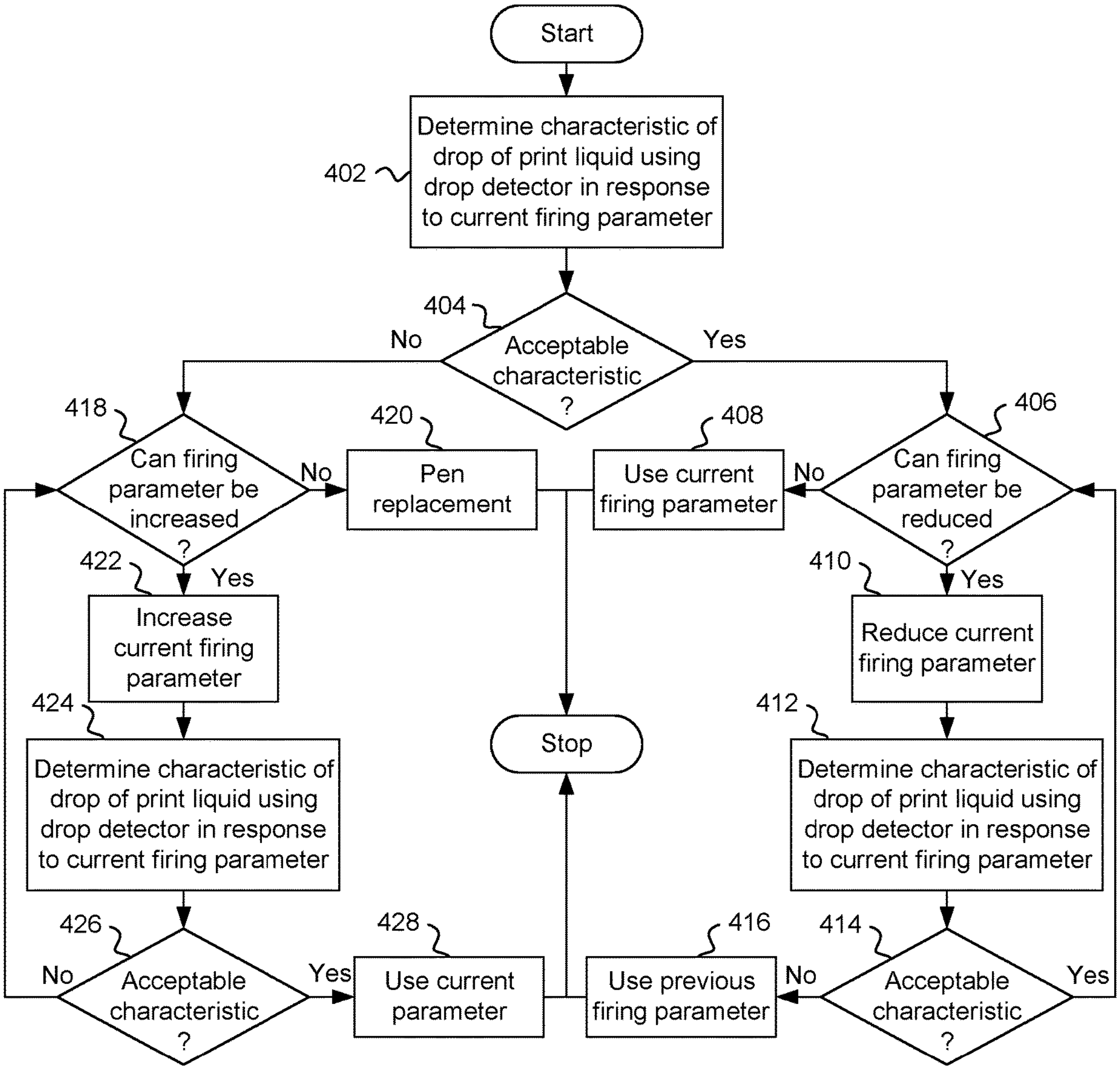
FIG. 4 shows a flowchart according to example implementations.

Referring to FIG. 4, there is shown a flowchart 400 according to an example implementation for managing printhead operational life. The operational life of a printhead is influenced by reducing a firing parameter of one or more than one nozzle of the printhead while maintaining printed image quality. At 402, a characteristic of a drop of print liquid in response to a current firing parameter is determined. The current firing parameter can comprise a parameter influencing a characteristic of a drop of print liquid such as, for example, at least one, or both, of drop velocity or drop size. Example implementations can be realised in which the current firing parameter is an OverEnergy factor setting that is applied to a Turn-On-Energy.

At 404, it is determined whether or not the characteristic of the drop of print liquid is acceptable. If the determination at 404 is acceptable, a determination is made, at 406, whether or not the current firing parameter can be changed, such as, for example, reduced. Any such variation can be subject to maintaining image quality of a printed image. If the current firing parameter cannot be changed due to, for example, the current value of the firing parameter being known to result in a drop of print liquid having a characteristic that adversely affects the print quality, the current firing parameter is used or set for use at 408 and thereafter processing stops.

If the determination at 406 is that the current firing parameter can be changed, the firing parameter is changed, such as, for example, reduced, at 410. Following such a change, at 412, the characteristic of a drop of print liquid in response to the current firing parameter is determined. It is determined, at 414, whether or not the determined characteristic of the drop of print liquid is acceptable. If the characteristic of the drop of print liquid is determined at 414 to be acceptable control or processing returns to 406. If the characteristic of the drop of print liquid is determined at 414 to be unacceptable, the, or a, previous acceptable firing parameter is set, at 416, to for use, or to be used, in firing the print nozzle and thereafter processing stops. The, or a, previous firing parameter is selected to maintain image quality.

If the determination at 404 is that the characteristic of the drop of print liquid is unacceptable, a determination is made, at 418, of whether or not the firing parameter can be changed, such as, for example, increased. If it is determined at 418 that the firing parameter cannot be changed the pen associated with the current nozzle under test is advised to be replaced at 420.

If it is determined at 418 that the firing parameter can be so changed, the current firing parameter is changed, such as, for example, increased, at 422. The characteristic of the drop of print liquid in response to the changed firing parameter is determined at 424. A determination is made, at 426, whether or not the determined characteristic of the current firing parameter is acceptable. If the determined characteristic of the current firing parameter is acceptable, the current firing parameter is used or stored for use in printing at 428 and processing thereafter terminates. If the determination at 426 is negative, control or processing returns to 418.

Therefore, a current firing parameter can be varied in a manner to prolong printhead life. Maintaining or prolonging printhead life can be realised without compromising print quality.

Over time, even at the reduced firing parameter setting, some degradation in the characteristic of the drop of print liquid can materialise to the point where increasing the firing parameter alone may be insufficient to recover, restore or otherwise improve the influence of the firing parameter on the characteristic of the drop of print liquid. Therefore, example implementations can be realised in which another parameter associated with the drop of print liquid is varied. For example, the temperature of the chamber of the nozzles can be varied such as, increased, to influence drop size of the print liquid to recover a loss in drop velocity. Controlling the temperature of the chamber of the nozzles is known as printhead warming. Therefore, example implementations can be realised in which such a temperature is varied or controlled according to the flowchart 400 in place of or in addition to the firing parameter.

Figure 5:
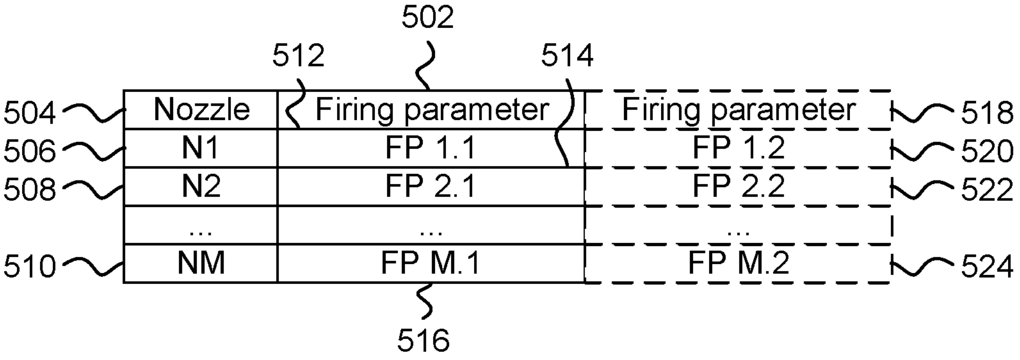
FIG. 5 illustrates a data structure according to example implementations.

Referring to FIG. 5, there is shown a view of a data structure 500 for storing at least one firing parameter 502 associated with a nozzle 504 of a printhead. The data structure 500 comprise a number 506 to 510 of entries corresponding addressable nozzles of the printhead, that is, nozzles numbered 1 to M. Each nozzles has an associated firing parameter 512 to 516. The firing parameters 512 to 516 are used to influence the firing of respective nozzles to eject drops of print liquid from respective nozzles. The firing parameters can comprise, for example, a parameter that influences a characteristic of a drop of print liquid such as, for example, at least one, or both, of TOE or OverEnergy.

The data structure 500 can comprise a further set 518 of firing parameters 520 to 524 that influence a characteristic of a drop of print liquid ejected from a respective nozzle. The further set of firing parameters 518 can comprise, for example, nozzle temperature, chamber 206 temperature or print liquid temperature, taken jointly and severally in any and all permutations, which, as indicated above, influence formation of the drop of print liquid.

The firing parameters stored in the data structure 502 can be adjusted as described above with reference to, for example, FIG. 4.

The data structure 502 can be stored by the printer 100 and used by the controller 118 in firing the nozzles of the printhead channels 110*a*, 110*b* while printing and/or periodically testing the performance of the nozzles.

Example implementations can be realised in the form of machine executable instructions arranged, when executed by a machine, to implement any or all aspects, processes, activities or flowcharts, taken jointly and severally in any and all permutations, described in this application. Therefore, implementations also provide machine-readable storage storing such machine executable instructions. The machine-readable storage can comprise non-transitory machine readable storage. The machine can comprise one or more processors or other circuitry for executing the instructions. For example, the controller 118 can process any such machine executable instructions or circuitry such as, for example, at least one, or both, of the above described software or circuitry 126 or 128.

Figure 6:
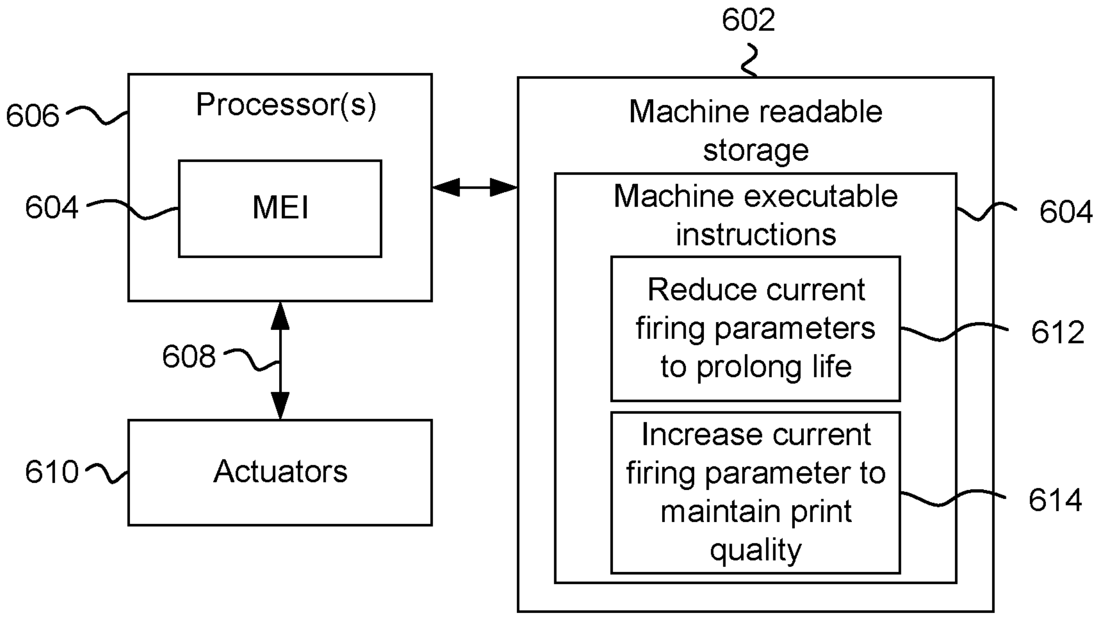
FIG. 6 depicts machine-readable storage and machine executable instructions according to some examples.

Referring to FIG. 6, there is shown a view 600 of implementations of at least one of machine executable instructions or machine-readable storage. FIG. 6 shows machine-readable storage 602. The machine-readable storage 602 can be realised using any type of volatile or non-volatile storage such as, for example, memory, a ROM, RAM, EEPROM, optical storage and the like. The machine-readable storage 602 can be transitory or non-transitory. The machine-readable storage 602 stores machine executable instructions (MEIs) 604. The MEIs 604 comprise instructions that are executable by a processor or other instruction execution circuitry 606. The processor or other circuitry 606 is responsive to executing the MEIs 604 to perform any and all activities, operations, methods described and claimed in this application.

The processor or other circuitry 606 can output control signals 608 for influencing the operation of one or more than one actuator 610 for performing any and all operations, activities or methods described and claimed in this application. The actuators 610 can comprise, for example, the heaters described above for ejecting drops of printing liquid from the nozzles of the printheads.

The controller 118 can be an implementation of the foregoing processor or other circuitry 606 for executing any such MEIs 604.

The MEIs 604 can comprise, for example, at least one, or both, of instructions for varying, such as, for example, reducing, the firing parameters as described and/or as claimed in this application, as can be appreciated from instructions 612, and/or instructions for varying, such as, for example, increasing, the firing parameters as described and/or as claimed in this application, as can be appreciated from instructions 614.

Suitably, executing such MEIs 504 realises the examples and example implementations described and/or claimed herein.

Any and all example implementations can be realised with or within a printer such as the printer described with reference to FIG. 1. The printer can be a multipass printer that is capable of printing at least one, or both, of bidirectionally or unidirectionally.

Although the above implementations have been described within a TIJ printing context, example implementations are not limited to such a technology. Any and all example implementations can be used for controlling printheads realised using technology other than TIJ technology such as, for example, piezoelectric print heads.

It will be appreciated the example implementations can be realised using page-wide printheads. Some printers have one or more than one print head that spans the medium to be printed. Such printers are known as page-wide arrays. Page-wide array printers can have static print heads, that is, the carriage bearing the print heads does not traverse the medium rather the medium moves relative to the one or more than one print head.

Example implementations can be realised in which the firing parameters are tested and changed periodically, or in response to a predetermined event such as, for example, change of a pen.

Example implementations can be realised according to the following clauses:

Clause 1. A method to manage printhead operational life; the method comprising: firing at least one nozzle of a printhead according to an associated firing parameter to produce a respective drop of print liquid, measuring a characteristic associated with the drop of print liquid, and adjusting the firing parameter in response to the measuring to vary, such as decrease or increase, the measured characteristic associated with the drop of print liquid on a subsequent firing, optionally, while maintaining the firing parameter at or above a predetermined parameter limit to maintain print image quality.

Clause 2. The method of clause 1, in which adjusting the firing parameter in response to the characteristic associated with the drop of print liquid comprises adjusting the firing parameter to influence drop formation.

Clause 3. The method of either of clauses 1 or 2, in which adjusting the firing parameter in response to the characteristic associated with the drop of print liquid comprises adjusting the firing parameter to influence at least one, or both, of drop mass or drop velocity.

Clause 4. The method of clause 3, in which adjusting the firing parameter in response to the characteristic associated with the drop of print liquid comprises adjusting the firing parameter to increase or decrease at least one, or both, of drop mass or drop velocity.

Clause 5. The method of clause 4, in which adjusting the firing parameter in response to the characteristic associated with the drop of print liquid comprises adjusting the firing parameter to decrease at least one, or both, of drop mass or drop velocity on the subsequent firing.

Clause 6. The method of any preceding clause, in which adjusting the firing parameter in response to the characteristic associated with the drop of print liquid comprises adjusting the firing parameter to decrease at least one, or both, of drop mass or drop velocity on the subsequent firing while maintaining at least one, or both, of drop mass or drop velocity within a predetermined operational range such as, for example, a pen operational range or pen population operational range or pen class operational range.

Clause 7. The method of clause 6, in which adjusting the firing parameter to decrease at least one, or both, of drop mass or drop velocity within a predetermined operational range comprises adjusting the firing parameter to decrease at least one, or both, of drop mass or drop velocity to a minimum of the predetermined operational range.

Clause 8. The method of clause 6 or clause 7, in which the predetermined operational range is associated with at least one, or more, of a pen, a pen population or class, or an ink.

Clause 9. The method of any of clauses 6 to 8, in which the firing parameter is associated with energy delivered to an actuator for firing the said at least one nozzle of the printhead to produce said respective drop of print liquid.

Clause 10. The method of clause 9, in which the firing parameter is associated with an Over Energy factor influencing the energy delivered to the actuator for firing the at least one nozzle of the printhead to produce the respective drop of print liquid.

Clause 11. The method of any preceding clause, in which adjusting the firing parameter in response to the characteristic associated with the drop of print liquid comprises adjusting an initialisation parameter associated with the printhead.

Clause 12. The method of clause 11, in which adjusting the initialisation parameter associated with the printhead comprises adjusting a factory or shipping firing parameter associated with the drop of print liquid.

Clause 13. The method of either of clauses 11 to 12, in which adjusting said initialisation parameter associated with the printhead comprises adjusting a temperature parameter associated with heating the printhead prior to said firing.

Clause 14. The method of clause 13, in which adjusting the temperature parameter associated with heating the printhead prior to said firing comprises setting the temperature parameter to increase or decrease the temperature of the printhead prior to said firing.

Clause 15. The method of either of clauses 13 to 14, in which adjusting the temperature parameter associated with heating the printhead prior to said firing comprises setting the temperature parameter to change at least one, or both, of drop mass or drop velocity.

Clause 16. A controller to manage printhead operational life; the controller comprising

- circuitry to fire at least one nozzle of a printhead according to an associated firing parameter to produce a respective drop of print liquid,
- circuitry to measure a characteristic associated with the drop of print liquid, and
- circuitry to adjust the firing parameter in response to the measuring to vary, such as reduce or increase, the measured characteristic associated with the drop of print liquid on a subsequent firing while maintaining the firing parameter at or above a predetermined parameter limit to maintain print image quality.

Clause 17. The controller of clause 16, in which the circuitry to adjust the firing parameter in response to the characteristic associated with the drop of print liquid comprises circuitry to adjust the firing parameter to influence drop formation.

Clause 18. The controller of clause 17, in which the circuitry to adjust the firing parameter in response to the characteristic associated with the drop of print liquid comprises circuitry to adjust the firing parameter to influence at least one, or both, of drop mass or drop velocity.

Clause 19. The controller of clause 18, in which the circuitry to adjust the firing parameter in response to the characteristic associated with the drop of print liquid comprises circuitry to adjust the firing parameter to increase or decrease at least one, or both, of drop mass or drop velocity.

Clause 20. The controller of clause 19, in which the circuitry to adjust the firing parameter in response to the characteristic associated with the drop of print liquid comprises circuitry to adjust the firing parameter to decrease at least one, or both, of drop mass or drop velocity on the subsequent firing.

Clause 21. The controller of any of clauses 16 to 20, in which the circuitry to adjust the firing parameter in response to the characteristic associated with the drop of print liquid comprises circuitry to adjust the firing parameter to decrease at least one, or both, of drop mass or drop velocity on the subsequent firing while maintaining at least one, or both, of drop mass or drop velocity within a predetermined operational range such as, for example, a pen operational range or pen population operational range.

Clause 22. The controller of clause 21, in which the circuitry to adjust the firing parameter to decrease at least one, or both, of drop mass or drop velocity within a predetermined operational range comprises adjusting the firing parameter to decrease at least one, or both, of drop mass or drop velocity to a minimum of the predetermined operational range.

Clause 23. The controller of clause 21 or clause 22, in which the predetermined operational range is associated with at least one, or more, of a pen, a pen class or an ink.

Clause 24. The controller of either of clauses 21 and 22, in which the firing parameter is associated with energy delivered to an actuator for firing the said at least one nozzle of the printhead to produce said respective drop of print liquid.

Clause 25. The controller of clause 24, in which the firing parameter is associated with an Over Energy factor influencing the energy delivered to the actuator for firing the at least one nozzle of the printhead to produce the respective drop of print liquid.

Clause 26. The controller of any of clauses 16 to 25, in which the circuitry to adjust the firing parameter in response to the characteristic associated with the drop of print liquid comprises adjusting an initialisation parameter associated with the printhead.

Clause 27. The controller of clause 26, in which the circuitry to adjust the initialisation parameter associated with the printhead comprises circuitry to adjust a factory or shipping firing parameter associated with the drop of print liquid.

Clause 28. The controller of either of clauses 26 to 27, in which the circuitry to adjust said initialisation parameter associated with the printhead comprises circuitry to adjust a temperature parameter associated with heating the printhead prior to said firing.

Clause 29. The controller of clause 28, in which the circuitry to adjust the temperature parameter associated with heating the printhead prior to printhead firing comprises circuitry to set the temperature parameter to increase or decrease heating the printhead prior to said firing.

Clause 30. The controller of either of clauses 28 and 29, in which the circuitry to adjust the temperature parameter associated with heating the printhead prior to said firing comprises circuitry to set the temperature parameter to change at least one, or both, of drop mass or drop velocity.

Clause 31. Machine executable instructions arranged, when executed by at least one processor, to implement a method of any of clauses 1 to 15.

Clause 32. Machine readable storage storing machine executable instructions of clause 31.

The invention claimed is:

1. A method to manage printhead operational life; the method comprising firing at least one nozzle of a printhead according to an associated firing parameter to produce a respective drop of print liquid, measuring a characteristic associated with the drop of print liquid, and adjusting the firing parameter in response to the measuring to vary the measured characteristic associated with the drop of print liquid on a subsequent firing while maintaining the firing parameter at or above at least one predetermined parameter limit, the firing parameter adjusted to adjust an OverEnergy value that simultaneously satisfies a predetermined drop trajectory error and a predetermined kogation error, the predetermined drop trajectory error corresponding to a first range of failure levels and the predetermined kogation error corresponding to a second range of failure levels different from the first range of failure levels, the first failure level and the second failure level falling within a known pen operating range that lies within a predetermined operating range of a class of pens.

2. The method of claim 1, in which adjusting the firing parameter in response to the characteristic associated with the drop of print liquid comprises adjusting the firing parameter to influence at least one of drop mass or drop velocity.

3. The method of claim 1, in which adjusting the firing parameter in response to the characteristic associated with the drop of print liquid comprises adjusting the firing parameter to at least one of increase or decrease at least one of drop mass or drop velocity.

4. The method of claim 1, in which adjusting the firing parameter in response to the characteristic associated with the drop of print liquid comprises adjusting the firing parameter to decrease at least one of drop mass or drop velocity on the subsequent firing while maintaining at least one of drop mass or drop velocity within a predetermined operational range.

5. The method of claim 4, in which adjusting the firing parameter to decrease at least one of drop mass or drop velocity within a predetermined operational range comprises adjusting the firing parameter to decrease at least one of drop mass or drop velocity to a minimum of the predetermined operational range.

6. The method of claim 4, in which the pen operating range lies within a predetermined pen class or corresponds to a predetermined ink.

7. The method of claim 4, in which the firing parameter is associated with energy delivered to an actuator for firing the said at least one nozzle of the printhead to produce said respective drop of print liquid.

8. The method of claim 7, in which the Over Energy factor value corresponds to the energy delivered to the actuator for firing the at least one nozzle of the printhead to produce the respective drop of print liquid.

9. The method of claim 1, in which adjusting the firing parameter in response to the characteristic associated with the drop of print liquid comprises adjusting an initialisation parameter associated with the printhead.

10. The method of claim 9, in which adjusting said initialisation parameter associated with the printhead comprises adjusting a temperature parameter associated with heating the printhead prior to printhead firing.

11. The method of claim 10, in which adjusting the temperature parameter associated with heating the printhead prior to printhead firing comprises setting the temperature parameter to increase or decrease heating the printhead prior to printhead firing.

12. The method of claim 11, in which adjusting the temperature parameter associated with heating the printhead prior to said firing comprises setting the temperature parameter to change at least one of drop mass or drop velocity.

13. Machine readable storage storing machine executable instructions arranged, when executed, to manage printhead operational life; comprising machine executable instructions to fire at least one nozzle of a printhead according to an associated firing parameter to produce a respective drop of print liquid, machine executable instructions to measure a characteristic associated with the drop of print liquid, and machine executable instructions to adjust the firing parameter in response to the measuring to vary the measured characteristic associated with the drop of print liquid on a subsequent firing while maintaining the firing parameter at or above at least one predetermined parameter limit, the firing parameter adjusted to adjust an OverEnergy value that simultaneously satisfies a predetermined drop trajectory error and a predetermined kogation error lying within a pen operating range, the predetermined drop trajectory error corresponding to a first range of failure levels and the predetermined kogation error corresponding to a second range of failure levels different from the first range of failure levels, the first failure level and the second failure level falling within a known pen operating range that lies within a predetermined operating range of a class of pens.

14. A controller to manage printhead operational life, the controller comprising circuitry to fire at least one nozzle of a printhead according to an associated firing parameter to produce a respective drop of print liquid, circuitry to measure a characteristic associated with the drop of print liquid, and circuitry to adjust the firing parameter in response to the measuring to vary the measured characteristic associated with the drop of print liquid on a subsequent firing while maintaining the firing parameter at or above at least one predetermined parameter limit, the firing parameter adjusted to adjust an OverEnergy value that simultaneously satisfies a predetermined drop trajectory error and a predetermined kogation error lying within a pen operating range, the predetermined drop trajectory error corresponding to a first range of failure levels and the predetermined kogation error corresponding to a second range of failure levels different from the first range of failure levels, the first failure level and the second failure level falling within a known pen operating range that lies within a predetermined operating range of a class of pens.

15. The controller of claim 14, in which the circuitry to adjust the firing parameter to vary the measured characteristic associated with the drop of print liquid comprises adjusting the firing parameter to decrease at least one of drop mass or drop velocity to a minimum of a predetermined operational range.

16. The method of claim 1, wherein the characteristic associated with the drop of print liquid is measured while the drop of print liquid is in the air between the at least one nozzle and a print medium.

17. The machine readable storage of claim 13, wherein the machine executable instructions to measure a characteristic associated with the drop of print liquid control the measuring while the drop of print liquid is in the air between the at least one nozzle and a print medium.

18. The controller of claim 14, wherein the circuitry to measure a characteristic associated with the drop of print liquid is to measure the drop of print liquid while the drop of print liquid is in the air between the at least one nozzle and a print medium.

* * * * *